United States Patent [19]
Sato

[11] Patent Number: 5,880,047
[45] Date of Patent: Mar. 9, 1999

[54] GRANULAR CERAMIC FOR IMPROVING BURNING EFFICIENCY OF HYDROCARBON OILS AND METHOD OF PRODUCING THE SAME

[75] Inventor: Kazuo Sato, Sendai, Japan

[73] Assignee: Tohoku Bankin Toso Kogyo Kabushiki Kaisha, Sendai, Japan

[21] Appl. No.: 910,099

[22] Filed: Aug. 13, 1997

[51] Int. Cl.⁶ ............................. C04B 35/00; C04B 35/16
[52] U.S. Cl. ......................... 501/125; 501/123; 501/127; 501/128; 501/130; 501/131; 501/141; 502/64; 502/68; 428/689; 264/66
[58] Field of Search ................................ 501/1, 123, 125, 501/128, 130, 131, 127, 141; 502/64, 68, 69; 428/688, 689; 423/213.2; 264/66

[56] References Cited

U.S. PATENT DOCUMENTS 5,178,768  1/1993  White, Jr. ................................ 210/663
5,382,416  1/1995  Nakano et al. ........................ 423/213.2
5,578,213  11/1996 Miller et al. ............................. 210/641
5,658,542  8/1997  Yoshida et al. ....................... 423/213.2

FOREIGN PATENT DOCUMENTS 8-208321 A  8/1996  Japan .

*Primary Examiner*—Michael Marcheschi
*Attorney, Agent, or Firm*—Paul A. Guss

[57] ABSTRACT

A granular ceramic is prepared by firing a powder of a natural zeolite mineral, a pre-fired powder composed of shell fragments, a pre-fired powder of a silica-alumina mineral, and a copper oxide powder. When used as a fuel additive, the ceramic makes it possible to improve the combustion efficiency of hydrocarbon oils, especially of petroleum products such as gasoline, gas oil kerosene, and heavy oil, as well as to reduce $CO_2$ and $NO_x$ emissions in exhaust gases discharged during combustion.

9 Claims, 3 Drawing Sheets

FIG. 1

|  | Test Vehicle   Mazda Capella   1800SGX<br>Engine Displacement   1800cc<br>Model Year   1987<br>Odometer Reading   200,000 km<br>Fuel Type   Regular Gasoline ||||||
|---|---|---|---|---|---|
|  | Inventive Example ||| Comparative Example ||
|  | Test1 | Test2 | Test3 | Test1 | Test2 |
| Travel Distance (km) | 822 | 740 | 795 | 704 | 969 |
| Total Fuel Consumed (ℓ) | 49.0 | 46.8 | 49.0 | 46.7 | 46.0 |
| Fuel Consumption (km/ℓ) | 16.8 | 15.8 | 16.2 | 15.1 | 15.1 |
| Average Fuel Consumption (km/ℓ) | 16.3 ||| 15.1 ||

FIG. 3

| | Amount of Kerosene Needed to Raise Water Temperature (g) | | | |
|---|---|---|---|---|
| | Inventive Example | | Comparative Example | |
| | Rise in Temperature from 20°C to 40°C | Rise in Temperature from 20°C to 50°C | Rise in Temperature from 20°C to 40°C | Rise in Temperature from 20°C to 50°C |
| Test 1 | 2.38 | 3.47 | 5.08 | 6.27 |
| Test 2 | 2.88 | 3.21 | 5.78 | 6.59 |
| Average | 2.63 | 3.34 | 5.43 | 6.43 |

FIG. 4

| | Central Flame Temperature (°C) | |
|---|---|---|
| | Inventive Example | Comparative Example |
| Test 1 | 657 | 598 |
| Test 2 | 627 | 588 |
| Test 3 | 627 | 608 |
| Test 4 | 637 | 608 |
| Test 5 | 618 | 588 |
| Average | 633 | 598 |

GRANULAR CERAMIC FOR IMPROVING BURNING EFFICIENCY OF HYDROCARBON OILS AND METHOD OF PRODUCING THE SAME

BACKGROUND OF THE INVENTION

1. Field of the Invention

The present invention relates to a granular ceramic for use when burning hydrocarbon oil, which makes it possible to improve the combustion efficiency of hydrocarbon oil, especially of petroleum products such as gasoline, gas oil, kerosene, and heavy oil, and to reduce unburned hydrocarbons, CO and generation of $NO_x$ emissions, and to alleviate blackened smoke fumes produced thereby, in exhaust gases discharged during combustion. The present invention also relates to a method of producing a granular ceramic for use when burning hydrocarbon oil.

2. Description of the Related Art

Various techniques for improving the combustion efficiency of petroleum products such as gasoline, gas oil, kerosene, and heavy oil have been hitherto investigated. Especially, at present, shortage of crude oil is a common problem in the world, and environmental problems are being discussed on a global scale. In such circumstances, in response to the demands for energy conservation and improvement of the environment, technological developments for efficient burning apparatuses and burning methods, as well as technological developments for the purpose of waste heat recovery are being actively performed.

When it is intended to practically use such a burning technique for energy conservation in a plant, or with equipment for production on an industrial scale, the most important problem is whether or not the investment in energy saving equipment will produce a satisfactory and cost-effective result in terms of energy savings. In the case of household oil burning machines and private automobiles used by ordinary consumers, it is undesirable if an accessory unit for energy savings excessively raises the price of the overall device as a commercial product. It is also important that such an accessory unit can be handled conveniently and safely by ordinary consumers. Taking such problems into consideration, the following suggestions have been made in order to more feasibly realize technological developments for efficient burning apparatuses and burning methods. Namely, it is a fact that combustion efficiency can be increased, and generation of unburned hydrocarbons and CO levels can be decreased, and as a result generation of blackened smoke fumes can be alleviated together with reduction in the generation of $NO_x$ emissions, by converting giant molecule groups of hydrocarbon oils into smaller molecule groups. An exemplary hydrocarbon oil, for which this technique can be implemented, is petroleum, in which several tens, hundreds, or even more hydrocarbon molecules make hydrogen bonds with each other, forming one molecule group. This fact has been confirmed by various experiments.

Known methods, which are effective as means for converting giant molecule groups of hydrocarbon oils into smaller molecule groups include 1) a method in which the hydrocarbon oils are irradiated with far infrared radiation, and 2) a method in which hydrocarbon oils are brought into contact with minerals having, for example, a high cation exchange ability, or wherein hydrocarbon oils are mixed with such minerals.

SUMMARY OF THE INVENTION

A general object of the present invention is to provide a ceramic which makes it possible to convert giant molecule groups of hydrocarbon oils into smaller molecule groups, especially in petroleum products such as gasoline, gas oil, kerosene, and heavy oil, together with a method for producing such a ceramic.

Another object of the present invention is to provide a ceramic which makes it possible to improve the combustion efficiency of hydrocarbon oils and to reduce the generation of unburned hydrocarbons, CO and $NO_x$ emissions in exhaust gasses discharged during combustion of hydrocarbon oil, while also alleviating blackened smoke fumes produced thereby, together with a method for producing such a ceramic.

Still another object of the present invention is to provide a ceramic which reduces fuel consumption in automobiles and improves the combustion efficiency of various oil burning machines, where the ceramic can be conveniently handled with high safety, together with a method for producing such a ceramic.

Still another object of the present invention is to provide a ceramic which is obtained by firing a powder of a natural zeolite mineral, a pre-fired powder composed of shells, a pre-fired powder of a silica-alumina mineral, and a powder of copper oxide, together with a method for producing such a ceramic.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 1 is a chart showing the results of a fuel consumption test performed on a four wheeled motor vehicle using the ceramic according to the first embodiment of the present invention.

FIG. 3 is a chart showing the amount of kerosene needed to raise a water temperature by fixed amounts, in the kerosene burning test.

FIG. 4 is a chart showing a central flame temperature measured during the kerosene burning test.

DESCRIPTION OF THE PREFERRED EMBODIMENTS

Figure 2:
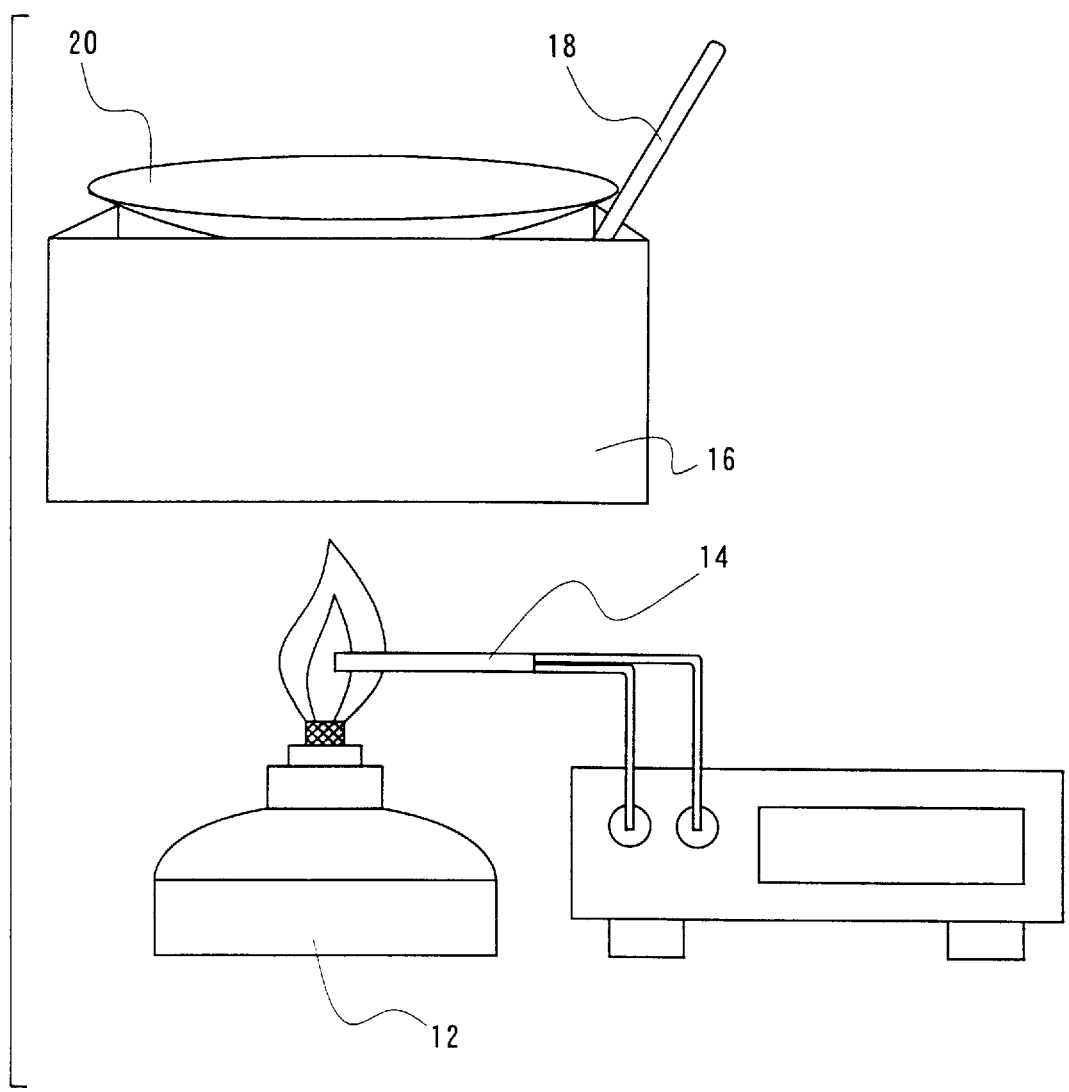
FIG. 2 is an explanatory view of a kerosene burning test performed using the ceramic according to the second embodiment of the present invention.

A ceramic of the present invention is a granular ceramic for burning hydrocarbon oil, prepared by firing 40 to 60% by weight of a powder of a natural zeolite mineral, 25 to 35% by weight of a pre-fired powder composed of shells, 12 to 18% by weight of pre-fired powder of a silica-alumina mineral, and 2 to 7% by weight of a powder of copper oxide.

In the present invention, the natural zeolite mineral powder, before being mixed and fired together with the other components, is not specifically limited to any particular type. However, preferable powders of natural zeolite minerals which may be used include, for example, unfired materials of mordenite and clinoptilolite. Further, it is possible to use pre-fired materials as well. The types of shells used are also not specifically limited. However, preferable shells which may be used include, for example, oyster shells and scallop shells. As for the silica-alumina mineral, appropriate minerals can be of any form, provided that they contain 70 to 90% by weight of silica and 5 to 25% by weight of alumina. As for the form of the ceramic, ceramics which are granular and having an average particle diameter of about 3 to 10 mm are preferred, because such ceramics do not suffer problems such as disruption during handling. However, the actual shape and size of the ceramics used are not limited, provided that no trouble occurs from this standpoint. The ceramic of the present invention can be produced by mixing a powder of a natural zeolite mineral which has been pulverized to have an average particle diameter of not more than 50 μm, a pre-fired powder composed of shells which has been pre-fired at a temperature of 680° to 880° C. for 10 to 60 minutes and then pulverized to have an average particle diameter of not more than 50 μm, a pre-fired powder of a silica-alumina mineral which has been pre-fired at a temperature of 620° to 820° C. for 10 to 60 minutes and then pulverized to have an average particle diameter of not more than 50 μm, a powder of copper oxide, and an appropriate amount of an organic binder, wherein such powders are mixed together to form granules; thereafter, heating the granules at a temperature of 500° to 600° C. for 1 to 6 hours; and finally firing the granules at a temperature of 700° to 1000° C. for 10 to 48 hours.

In the present invention, cupric oxide is preferably used as the copper oxide, however, the invention is not necessarily limited to any specific copper oxide. In place of the copper oxide, respective oxides of sodium, selenium, molybdenum, platinum, and lithium may also be used. The pre-fired shell powder, as well as the pre-fired silica-alumina mineral powder, when at a stage before being formed into granules, may be prepared by initial pulverization and subsequent pre-firing thereof. Alternatively, the pre-fired shell powder and the pre-fired silica-alumina mineral powder, at a stage before being formed into granules, may be prepared by initially mixing both powders together to obtain a combined mixture thereof, which is then subjected to pulverization and subsequent firing, or also, the combined mixture can be subjected first to firing with subsequent pulverization. Alternatively, a pre-fired material may also be used as the natural zeolite mineral powder, before being mixed and fired together with the other components, and in this case it is possible to use a material prepared by pre-firing at 680° to 880° C. for 10 to 60 minutes, with subsequent pulverization, to result in an average particle diameter of not more than 50 μm. In the method for producing the ceramic according to the present invention, any known apparatus for performing firing may be employed, for example, an electric furnace and rotary kiln can be appropriately selected, taking into consideration the pulverizing characteristics of the powder to be handled. The apparatus which is used for forming granules is likewise not limited to any specific structure, but for example, a rotary drum can be appropriately selected and used. An appropriate organic binder may include, for example, a glutinous starch syrup-like food additive, which is generally used when the granules are formed. The amount of organic binder which is added may be selected based on ordinary practices and usage, for example, in an amount of about several hundreds to several ten thousands ppm. Only scarce amounts of the added binder remain in the product after completion of firing. The fuel consumption of gasoline-fueled automobiles can be greatly reduced by adding the ceramic of the present invention to the gasoline tank, in a range of 2 to 20 g per 1 liter of gasoline. Simultaneously, it is also possible to reduce the amount and concentration of unburned hydrocarbons, CO and $NO_x$ emissions in the exhaust gas, while at the same time alleviating the generation of blackened smoke fumes produced thereby. The combustion efficiency, and the nature of the exhaust gases discharged during combustion, in oil burning machinery which use kerosene as fuel can be greatly improved by adding the ceramic of the present invention to kerosene, in a range of 30 to 300 g per 1 liter of kerosene.

The foregoing descriptions of gasoline or kerosene are merely illustrative of the types of hydrocarbon oils to which the present invention can apply. However, it shall be easily understood that the teachings of the present invention can apply appropriately to other hydrocarbon oils, and represented by petroleum products other than kerosene.

As for measures which permit the ceramic to come into contact with the hydrocarbon oil, a method in which the granular ceramic material is added to the storage tank containing the hydrocarbon oil, followed by agitation thereof, or being left to stand stationary for a given period of time, may be used. A further preferable method is to use a strainer, charged with the ceramic material therein in the form of a filter medium, wherein the hydrocarbon oil can be filtered therethrough.

ILLUSTRATIVE EXAMPLES

Next, the ceramic according to the present invention, and a relevant method for producing the same, will be explained in detail below with reference to preferred embodiments:

At first, a ceramic according to a first embodiment of the present invention was produced by means of the following method.

Natural zeolite, principally comprising a hard type of mordenite, was pulverized to an average particle size of about 2 μm, thereby preparing a powder. Separately therefrom, shells including oyster and scallop shells were pre-fired at a temperature of about 750° C. for approximately 30 minutes using a rotary kiln. The obtained pre-fired material was pulverized to an average particle size of 2 μm, thereby providing a pre-fired powder of shells. A clay mineral containing about 80% by weight of silica and about 15% by weight of alumina was fired at a temperature of about 650° C. for approximately 30 minutes using a rotary kiln. The obtained pre-fired material was pulverized to an average particle size of about 2 μm, thereby providing a pre-fired silica-alumina mineral powder. A copper oxide, consisting of cupric oxide, was processed into a powder. The foregoing powders were blended in a ratio of 50% by weight of the natural zeolite powder, 30% by weight of the pre-fired shell powder, 15% by weight of the pre-fired silica-alumina mineral powder, and 5% by weight of the copper oxide powder. A glutinous starch syrup was added thereto as an organic binder, in an amount of 1000 ppm. Thereafter, the materials were formed into granules having an average particle diameter of about 5 mm using a rotary drum. Next, the granules were heated in an electric furnace, at a temperature of about 500° C. for approximately 2 hours. Subsequently, the temperature was raised to perform a firing treatment at a temperature of about 840° C. for approximately 12 hours. Thus, the ceramic according to the first embodiment of the present invention was obtained.

Secondly, a ceramic according to a second embodiment of the present invention was produced by means of the following method.

Natural zeolite, principally comprising a hard type mordenite, was pulverized to an average particle size of about 2 μm, thereby preparing a powder. Separately therefrom, shells including oyster and scallop shells were pre-fired at a temperature of about 780° C. for approximately 20 minutes using a rotary kiln. The obtained pre-fired material was pulverized to a particle size of about 2 μm, thereby preparing a pre-fired powder of shells. A clay mineral containing about 80% by weight of silica and about 15% by weight of alumina was pre-fired at a temperature of about 720° C. for approximately 20 minutes using a rotary kiln. The obtained pre-fired material was pulverized to a particle size of about 2 μm, thereby preparing a pre-fired silica-alumina powder. A copper oxide, consisting of cupric oxide, was processing into a powder. The foregoing powders were blended in a ratio of 48% by weight of the natural zeolite powder, 35% by weight of the pre-fired powder of shells, 14% by weight of the pre-fired silica-alumina mineral powder, and 3% by weight of the copper oxide powder. A glutinous starch syrup was added thereto as an organic binder in an amount of 1000 ppm. After that, the material were formed into granules, having an average particle diameter of about 5 mm, using a rotary drum. Next, the granules were heated in an electric furnace at a temperature of about 530° C. for approximately 3 hours. Subsequently, the temperature was raised, to perform a firing treatment at a temperature of about 815° C. for approximately 30 hours. Thus, a ceramic according to the second embodiment of the present invention was obtained.

A fuel consumption test was preformed on a four-wheeled vehicle using the ceramic according to the first embodiment of the present invention. As the four-wheeled vehicle, an 1986 model year ordinary passenger vehicle having an 1800 cc engine displacement, and running on ordinary gasoline, was used. At the time the test was conducted, the vehicle was approximately 10 years old. In the inventive example, a filter device charged with 350 g of the inventive ceramic according to the first embodiment was disposed in the fuel supply line between the fuel tank and the engine, the gasoline tank of the vehicle was filled to capacity, and the vehicle was then subjected to a running condition. In the comparative example, the filter device and the inventive ceramic were not used, but as with the inventive example, the gasoline tank of the vehicle was filled to capacity, and the vehicle was then subjected to the same running conditions. After the vehicle had been run for various respective distances, the vehicle was again supplied with fuel, and at that time the fuel consumption, based on the travelling distance and amount of fuel used, was determined. The results of the test are shown in the chart of FIG. 1. As shown therein, in the inventive example, the average of three test runs indicated that a distance of 16.3 km was achieved per one liter of gasoline, whereas in the comparative example, a distance of only 15.1 km was achieved per one liter of gasoline, thus demonstrating that in the inventive examples, using the filter device charged with the ceramic, an improvement in fuel consumption of roughly 8% was confirmed.

A comparative fuel (kerosene) burning test was performed using the ceramic according to the second embodiment of the present invention. As shown in FIG. 2, a kerosene lamp 12 was filled with approximately 100 g of kerosene. In the inventive example, 3 g of the ceramic according to the second embodiment of the invention was added to the kerosene, and the mixture was left to stand still for 26 days, and thereafter a burning test was conducted. In the comparative example, the ceramic was not added, but otherwise the test conditions were the same. Using such a kerosene lamp 12, a stainless steel vat 16 filled with 500 g of water was heated. A thermometer 18 was placed into the stainless steel vat 16. In order to assist in heating the water under a fixed condition in which the outflow of steam vapor was suppressed, a plate 20 having a downward facing convey surface was placed over the vat 16. Further, the temperature produced at the center of the flame during burning of the fuel was measured using a thermocouple 14.

FIG. 3 shows the results of the amount of kerosene needed to raise the water temperature by various given amounts, wherein the water was raised in temperature from 20° C. to 40° C. and from 20° C. to 50° C. respectively. In the inventive example, in contrast to the comparative example, a result wherein the amount of consumed fuel was reduced by roughly 50% was achieved. Further, as shown in FIG. 4, in the inventive example, in contrast to the comparative example, the central flame temperature at the time of fuel burning was roughly 35° C. higher in temperature, clearly demonstrating a more favorable burning condition.

What is claimed is:

1. A granular ceramic for improving burning efficiency of hydrocarbon oils, comprising fired granules of a composite material comprising 40 to 60% by weight of a natural zeolite mineral powder, 25 to 35% by weight of a pre-fired powder composed of shells, 12 to 18% by weight of a pre-fired silica-alumina mineral powder, and 2 to 7% by weight of a copper oxide powder.

2. The granular ceramic according to claim 1, wherein said natural zeolite mineral powder comprises a pre-fired natural zeolite mineral powder.

3. A method for producing a granular ceramic for improving burning efficiency of hydrocarbon oils, comprising the steps of:

pre-firing shells at 680° to 880° C. for 10 to 60 minutes, and pulverizing said shells to have an average particle diameter of not more than 50 μm, to thereby produce a pre-fired powder composed of shells;

pre-firing a silica-alumina mineral at 620° to 820° C. for 10 to 60 minutes, and pulverizing said silica-alumina mineral to have an average particle diameter of not more than 50 μm, to thereby produce a pre-fired silica-alumina mineral powder;

pulverizing a natural zeolite mineral to have an average particle diameter of not more than 50 μm, to thereby produce a natural zeolite mineral powder; preparing a powder of copper oxide;

mixing 25 to 30% by weight of said pre-fired powder composed of shells, 12 to 18% by weight of said pre-fired silica-alumina mineral powder, 40 to 60% by weight of said natural zeolite mineral powder and 2 to 7% by weight of said copper oxide powder, together with an organic binder, to thereby form granules;

heating said granules at 500 to 600° C. for 1 to 6 hours; and firing said granules at 700° to 1000° C. for 10 to 48 hours.

4. The method according to claim 3, wherein said shells are first pulverized, and thereafter pre-fired to produce said pre-fired powder composed of shells.

5. The method according to claim 3, wherein said shells are first pre-fired, and thereafter pulverized to produce said pre-fired powder composed of shells.

6. The method according to claim 3, wherein said silica-alumina mineral is first pulverized, and thereafter pre-fired to produce said pre-fired silica-alumina powder.

7. The method according to claim 3, wherein said silica-alumina mineral is first pre-fired, and thereafter pulverized to produce said pre-fired silica alumina.

8. A method according to claim 3, further comprising the step of pre-firing said natural zeolite mineral at 680° to 880° C. for 10 to 60 minutes.

9. A method for producing a granular ceramic for improving burning efficiency of hydrocarbon oils, comprising the steps of:

mixing together shells and a silica-alumina mineral to form a combined mixture thereof;

pre-firing and pulverizing the combined mixture to have an average particle diameter of not more than 50 μm, to thereby produce a pre-fired mixed powder of said shells and said silica-alumina mineral;

pulverizing a natural zeolite mineral to have an average particle diameter of not more than 50 μm, to thereby produce a natural zeolite mineral powder;

preparing a powder of copper oxide;

mixing said pre-fired mixed powder, said natural zeolite mineral powder and said copper oxide powder together with an organic binder, to thereby form granules, wherein said granules comprise 25 to 30% by weight of said shells, 12 to 18% by weight of said silica-alumina mineral, 40–60% by weight of said natural zeolite mineral powder and 2 to 7% by weight of said copper oxide powder;

heating said granules at 500° to 600° C. for 1 to 6 hours; and firing said granules at 700° to 1000° C. to 10 to 48 hours.

* * * * *